US009571371B2

(12) United States Patent
Fukuda et al.

(10) Patent No.: US 9,571,371 B2
(45) Date of Patent: Feb. 14, 2017

(54) NETWORK CONNECTION COMMUNICATION SYSTEM

(71) Applicant: Japan Communications Inc., Tokyo (JP)

(72) Inventors: Naohisa Fukuda, Kitasaku-gun (JP); Seiji Sanda, Tokyo (JP); Akihiko Sawa, Tokyo (JP); Mitsuteru Okazaki, Tokyo (JP); Jun Tajima, Tokyo (JP); Nobuhisa Yoda, Centennial, CO (US)

(73) Assignee: Japan Communications Inc., Tokyo (JP)

( * ) Notice: Subject to any disclaimer, the term of this patent is extended or adjusted under 35 U.S.C. 154(b) by 64 days.

(21) Appl. No.: 14/737,296

(22) Filed: Jun. 11, 2015

(65) Prior Publication Data

US 2015/0281034 A1 Oct. 1, 2015

Related U.S. Application Data

(63) Continuation of application No. 13/256,433, filed as application No. PCT/JP2010/054114 on Mar. 11, 2010, now Pat. No. 9,083,820.

(30) Foreign Application Priority Data

Mar. 13, 2009 (JP) .................................. 2009-061866

(51) Int. Cl.
*H04L 12/26* (2006.01)
*G06Q 30/04* (2012.01)
(Continued)

(52) U.S. Cl.
CPC ..... *H04L 43/0882* (2013.01); *G06F 17/30106* (2013.01); *G06Q 30/04* (2013.01);
(Continued)

(58) Field of Classification Search
CPC ... H04M 15/00–15/42; H04M 15/82–15/8285; H04M 17/35; H04M 15/08; H04M 2215/78; H04M 2215/7813; H04M 2215/782; H04L 43/0882; H04L 12/14; H04L 12/1432; H04L 14/1485; H04L 67/22; G06Q 30/04; G06F 17/30106
See application file for complete search history.

(56) References Cited

U.S. PATENT DOCUMENTS 5,446,733 A * 8/1995 Tsuruoka ............ H04L 12/2854
370/232
5,987,430 A 11/1999 Van Horne et al.
(Continued)

FOREIGN PATENT DOCUMENTS

JP H07327094 A 12/1995
JP H09261339 A 10/1997
(Continued)

OTHER PUBLICATIONS

Faizullah, S. "Pricing and Charging QoS" 2005, IEEE, p. 1-6.
(Continued)

*Primary Examiner* — Matthew Smithers
(74) *Attorney, Agent, or Firm* — Wilson Sonsini Goodrich & Rosati

(57) ABSTRACT

Provided is a technology that makes it possible for billing and balance management in the form of units that are difficult to understand for a user, to be expressed and managed in the form of units that are easy to understand from the viewpoint of the actual purpose of use. The network connection communication system is provided with means for expressing the unit price of network usage in terms of units that a user can understand more intuitively in the light of the purpose for which the network is used. For instance, the number of connection minutes (time), the number of books purchased and downloaded over the network, or the
(Continued)

number of connections to a communicating partner can be used depending on the purpose of use of a service.

14 Claims, 11 Drawing Sheets

(51) Int. Cl.

| | | |
|---|---|---|
| *H04L 12/14* | (2006.01) | |
| *H04M 15/00* | (2006.01) | |
| *H04M 15/08* | (2006.01) | |
| *G06F 17/30* | (2006.01) | |
| *H04L 29/08* | (2006.01) | |

(52) U.S. Cl.
CPC .......... *H04L 12/14* (2013.01); *H04L 12/1432* (2013.01); *H04L 12/1485* (2013.01); *H04L 67/22* (2013.01); *H04M 15/00* (2013.01); *H04M 15/08* (2013.01); *H04M 15/82* (2013.01); *H04M 15/8207* (2013.01); *H04M 15/8214* (2013.01); *H04M 2215/78* (2013.01); *H04M 2215/782* (2013.01); *H04M 2215/7813* (2013.01)

(56) References Cited

U.S. PATENT DOCUMENTS

| | | | |
|---|---|---|---|
| 6,795,856 B1 | 9/2004 | Bunch | |
| 7,083,095 B2 | 8/2006 | Hendrick | |
| 7,574,661 B2 | 8/2009 | Matsuura et al. | |
| 7,852,849 B2 | 12/2010 | Davidson et al. | |
| 8,352,449 B1 | 1/2013 | Parekh et al. | |
| 9,083,820 B2 | 7/2015 | Fukuda et al. | |
| 2001/0027449 A1* | 10/2001 | Wright | G06Q 30/04 705/412 |
| 2002/0161676 A1 | 10/2002 | Vadlamani | |
| 2002/0162008 A1 | 10/2002 | Hill | |
| 2002/0174235 A1 | 11/2002 | Likourezos | |
| 2003/0061179 A1* | 3/2003 | Reece | G06Q 30/0283 705/412 |
| 2003/0097461 A1* | 5/2003 | Barham | H04L 29/06 709/235 |
| 2003/0204443 A1 | 10/2003 | Knox | |
| 2005/0003824 A1* | 1/2005 | Siris | H04L 47/10 455/452.1 |
| 2006/0026268 A1 | 2/2006 | Sanda | |
| 2006/0034437 A1 | 2/2006 | Trabandt et al. | |
| 2006/0056426 A1* | 3/2006 | Wakameda | H04L 12/5692 370/401 |
| 2006/0156209 A1 | 7/2006 | Matsuura et al. | |
| 2007/0038466 A1 | 2/2007 | Lind et al. | |
| 2008/0101229 A1* | 5/2008 | Meleis | H04L 43/16 370/233 |
| 2008/0273553 A1* | 11/2008 | Wang | H04L 12/5695 370/468 |
| 2009/0094521 A1 | 4/2009 | Hung et al. | |
| 2009/0132400 A1 | 5/2009 | Conway | |
| 2009/0292933 A1 | 11/2009 | Livni et al. | |
| 2010/0017506 A1* | 1/2010 | Fadell | H04M 15/00 709/224 |
| 2010/0318647 A1* | 12/2010 | Savoor | G06Q 50/06 709/224 |
| 2012/0117236 A1 | 5/2012 | Fukuda et al. | |
| 2014/0220931 A1 | 8/2014 | Titus, Jr. et al. | |

FOREIGN PATENT DOCUMENTS

| | | |
|---|---|---|
| JP | 2939723 B2 | 8/1999 |
| JP | 2000332919 A | 11/2000 |
| JP | 2002352149 A | 12/2002 |
| JP | 2003008787 A | 1/2003 |
| JP | 3434271 B2 | 8/2003 |
| JP | 2004048289 A | 2/2004 |
| JP | 2004151786 A | 5/2004 |
| JP | 2006050594 A | 2/2006 |
| JP | 2008283576 A | 11/2008 |

OTHER PUBLICATIONS

International search report and written opinion dated Jun. 15, 2010 for PCT/JP2010/054114.

Japan Communications Inc. press release of Mar. 10, 2009, "Japan Communications Inc. introduces new charging scheme "Doccica", by which wireless LAN can be used in Shinkansen and 3G 3G+WiFi can be easily used at the destination"; internet <URL:1268273886156_1.html>.

Japan Communications Inc. press release of Mar. 15, 2005, "Japan Communications Inc. launches new b-mobile hours for casual-mobile internet"; internet <URL:12682738861556_0.html>.

Lin, et al. Credit allocation for UMTS prepaid service. IEEE. Jan. 2006; 55(1):306-316.

Notice of allowance dated Apr. 22, 2015 for U.S. Appl. No. 13/256,433.

Office action dated May 14, 2014 for U.S. Appl. No. 13/256,433.
Office action dated Aug. 7, 2013 for U.S. Appl. No. 13/256,433.
Office action dated Oct. 28, 2014 for U.S. Appl. No. 13/256,433.
Office action dated Nov. 6, 2012 for U.S. Appl. No. 13/256,433.

* cited by examiner

| NETWORK TYPE | COEFFICIENT |
|---|---|
| W-CDMA(3G) | 1 |
| WiFi | 3 |
| WiMAX | 2 |
| FIXED | 144 |

(b)

| SERVICE TYPE | COEFFICIENT |
|---|---|
| MAIL ONLY | 24 |
| INTRANET | 2 |
| WEB BROWSER | 1 |
| VIDEO DELIVERY | 0.3 |

(c)

| TERMINAL TYPE | COEFFICIENT |
|---|---|
| PC | 1 |
| SMARTPHONE | 2 |

(d)

| NETWORK UTILIZATION RATIO | COEFFICIENT |
|---|---|
| LESS THAN 20% | 1.3 |
| FROM 20% OR GREATER TO LESS THAN 80% | 1 |
| 80% OR MORE | 0.3 |

Fig. 10

| USER ID | TERMINAL TELEPHONE NUMBER | SUM BALANCE | PERIOD OF VALIDITY OF BALANCE |
|---|---|---|---|
| 001 | 1234 | 1,000 | 2009/4/1 |
| 002 | 1235 | 0 | 2008/03/11 |
| 003 | 1236 | 2,000 | 2010/5/1 |
| 004 | 1211 | 1,230 | 2009/5/2 |
| ... | ... | ... | ... |
| 998 | 4848 | 500 | 2009/8/31 |
| 999 | 4800 | 0 | 2009/10/1 |

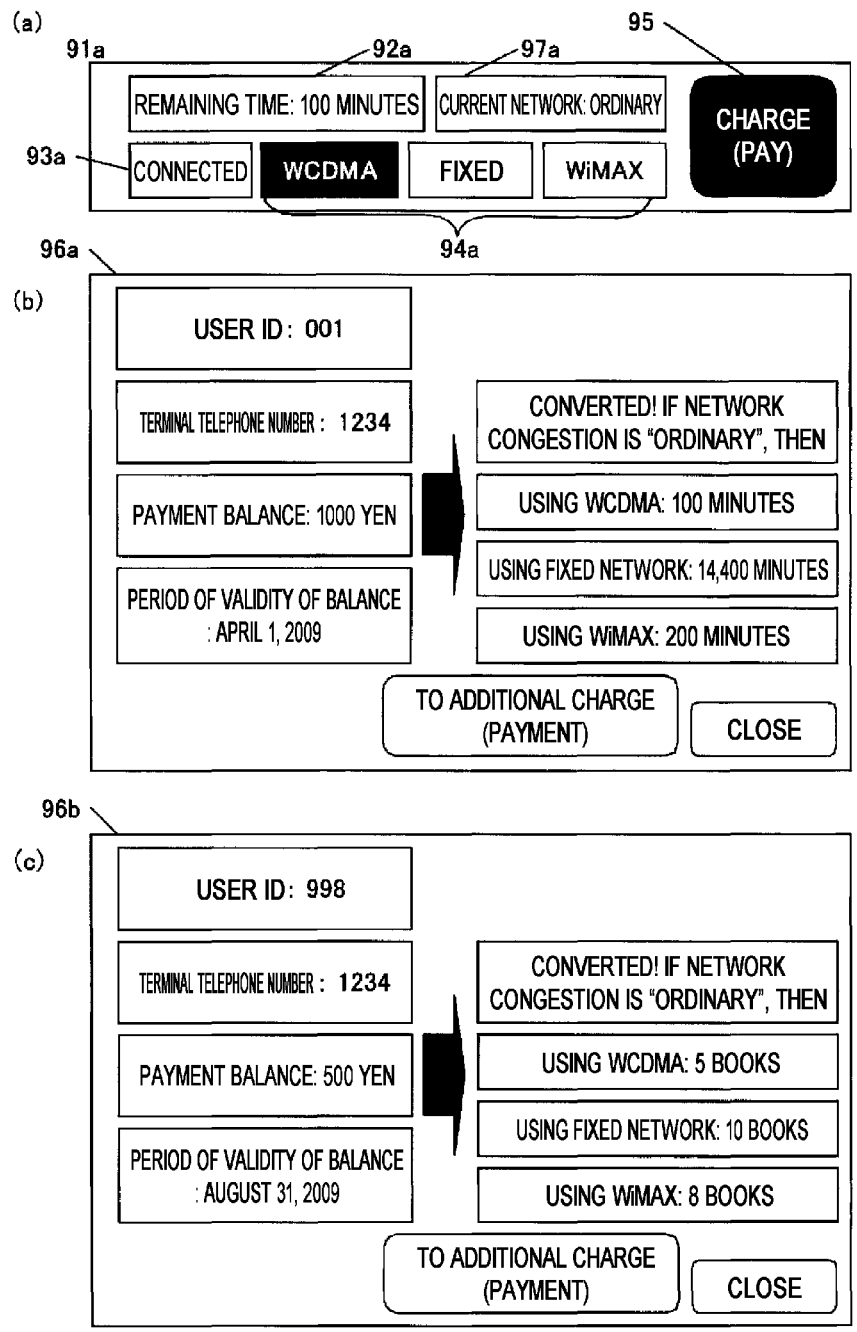

NETWORK CONNECTION COMMUNICATION SYSTEM

CROSS-REFERENCE

This application is a continuation of, and claims priority to, U.S. patent application Ser. No. 13/256,433, filed Dec. 20, 2011, which claims the benefit of, and priority to, the National Stage of International Application No. PCT/JP2010/054114, filed Mar. 11, 2010, which claims the benefit of Japanese Application No. 2009-061866, filed Mar. 13, 2009, the disclosures of which are all incorporated herein by reference.

The invention of the present application relates to a system for providing a service which allows an information terminal to be connected for communication, via a fixed network or a mobile wireless network, to a user that utilizes another information terminal and to an unspecified plurality of servers connected to a network such as the internet for instance. In particular, it relates to a service billing method in a system in which one or a plurality of schemes from among a plurality of network communication schemes are selectively used upon billing for allowing connection of an information terminal to a network.

BACKGROUND OF THE INVENTION

When a user, as the owner of an information terminal, obtained information from a server via a network, the information terminal was connected physically to a fixed communication network, or to a mobile wireless network, and the information terminal accessed a server via a network such as the internet. In this case, communication speed and communication costs were different if the plurality of networks involved respectively different communication schemes. The user could respectively conclude connection service agreements with individual service providers that provide services over the networks having the separate communication schemes. In the service of providing a plurality of kinds of network connection, a connection time was purchased beforehand for a time-limited use charging. In addition, connection services have been provided that are billed on a monthly flat rate basis or on pay-as-you-go basis depending on data volume.

Prior art examples of the above are given below.

Japanese Patent No. 2939723 (Patent document 1) discloses a time-limited use charging system for internet wherein a terminal having client software installed therein is connected to the internet through dial-up to a port of an internet connection service provider, via a telephone line, such that connection is allowed until a connection frequency, set beforehand for each client and which denotes the time of available use, reaches 0 (zero) through subtraction.

Japanese Patent No. 3434271 (Patent document 2) discloses a network connection system, a connection fee calculation method in a network connection service, and a billing system in a network connection service, wherein a fee-charging classification pattern is recorded beforehand for each user, in cases where the line utilization fee is different depending on, for instance, the site of user access, and the person that pays the line utilization fee may be a sender or a recipient, and cases where billing companies that bill for the network connection service fee and for the line utilization fee are different entities, as a result of which, a billing address and sum for the line utilization fee are calculated referring to the charging pattern, and billing data is generated by totaling the service utilization fees.

Non-patent document 1 discloses a product "b mobile HOURS" (combination of PHS communication and public wireless LAN), in which there is provided an internet connection service through purchase beforehand of the number of hours, such that communication is enabled by selecting either PHS communication or public wireless LAN. If a public-line LAN is used, the service is such that usage is unlimited one day at a time, and five hours are subtracted from the time balance of the user, out of the purchased time.

Non-patent document 2 discloses a press release by Japan Communications Inc. on Mar. 10, 2009, of a product "b mobile 3G DOCCICA", being a service in which the user buys beforehand usage time of use of a WCDMA network, and connection is available until the balance time is used up, such that communication is enabled by selecting either WCDMA communication (3G data communication) or public wireless LAN communication (WiFi). If a public line LAN is used, the service is such that usage is unlimited one day at a time, and 30 minutes are subtracted from the time balance.

Patent document 1: Japanese Patent Publication No. 2939723

Patent document 2: Japanese Patent Publication No. 3434271

Non-patent document 1 (Japan Communications Inc. press release of Mar. 15, 2005, "Japan Communications Inc. launches new b-mobile hours for casual-mobile internet"; internet <URL:1268273886156_0.html>

Non-patent document 2 (Japan Communications Inc. press release of Mar. 10, 2009, "Japan Communications Inc. introduces new charging scheme "Doccica", by which wireless LAN can be used in Shinkansen and 3G 3G+WiFi can be easily used at the destination"; internet <URL: 1268273886156_1.html>

Conventionally, fees have been determined based on the transmitted bit count or number of packets, in environments where communication takes place through connection to a server upon selection of an arbitrary network from among a plurality of networks. However, these data volumes depend on the web site and so forth, and on the expression of the information that is obtained via the network. Also, the data volume is often not definite beforehand at the time of accessing the information. Therefore, pay-as-you-go billing depending on packet volume was hard to understand for the user in that the volume of data for communication was difficult to predict. In a case where the service is provided under a monthly flat rate, for instance, the user paid a flat fee also for a month in which the service had hardly been used, which impressed the user as wasteful.

Network communication fees must be paid for each scheme when the communication network that the system can use spans a plurality of communication schemes. Also, depending on the communication network, the billing schemes may be based on amount of data used, flat rates or time rates, and are confusing for the user. In the case for instance of electronic mail, the volume of data that utilizes the network increases whenever an external mail arrives, even if the user is not particularly operating the terminal. In web browsing, by contrast, the data volume I consumed varies depending on the purpose for which the network is used, such as network communication only at the time where the web is actually accessed for referring to information sites or the like. However, the billing system is often based exclusively on communication time or data communication volume, and it was thus hard for the user to feel intuitively that the communication fees are correctly priced.

A problem arose in that it was thus hard for the user to understand a time subtracting process depending on the network to be used in a case of a service such that one network out of a plurality thereof is selected for connection to the internet, and such that, for instance, the usage of the service is allowed until there are exhausted the number of connection hours, being the number of usage units, purchased in advance by the user, as the number of hours that the service can utilize any of the networks.

SUMMARY OF THE INVENTION

A main object of the present invention is to provide a technology that makes it possible for billing and balance management in the form of units that are difficult to understand for a user, as in conventional cases, to be expressed and managed in the form of units that are easy to understand from the viewpoint of the actual purpose of use. A further object is to provide a technology wherein, in case of multiple purposes, units are managed in the form of neutral units independently from the purpose for which the units are used. It is yet another object to provide a technology that allows increasing the utilization efficiency of network resources, regardless of the type of communication, either wireless or fixed, by urging the user to utilize the network in ways and at timings that afford greater savings in network costs.

In order to solve the above problems, in the invention of the present application, there is provided means for expressing the unit price of network usage in terms of units that a user can understand more intuitively in the light of the purpose for which the network is used. Depending on the purpose of use of the service, for instance, there can be used connection minutes (time), or the number of books (number or articles) purchased and downloaded over the network, or the number of connections with a partner for communication.

In a first main aspect of the present invention, there is provided a server connection system (network communication connection system) having: means for connection to a plurality of networks; means for pay-as-you-go billing of data in time units; means for subtracting (counting down) in minute units or the like, and displaying a remaining time; means (UI: user interface) through which the user designates start and end of use; a timer that counts usage time; a database that manages remaining time (minutes); a database that manages characteristics of usage conditions, on the basis of coefficients; and means for converting the available remaining time according to the usage conditions.

In one embodiment of the present invention, the means of subtracting data in the time units can do so in minute units.

In another embodiment of the present invention, the number of books can be used as the usage unit.

In yet another embodiment of the present invention, there is provided means for individually converting and displaying the number of usage units according to a given fixed sum, for each selectable network, upon purchase or addition of the number of usage units.

The present invention makes it possible for billing and balance management in the form of units that are difficult to understand for a user, as in conventional cases, to be expressed and managed in the form of units that are easy to understand from the viewpoint of the actual purpose of use. Further, the present invention allows increasing the utilization efficiency of network resources, regardless of the type of communication, either wireless or fixed, by urging the user to utilize the network in ways and at timings that afford greater savings in network costs.

DESCRIPTION OF THE DRAWINGS

FIG. 6 is a diagram illustrating a configuration example of a coefficient management database;

FIG. 10 is a diagram illustrating a table configuration example of a user database 32b in a third example; and FIG. 11 is a diagram illustrating a display screen example of a payment balance in the third example.

DETAILED DESCRIPTION

Embodiments of the present invention (for instance, Examples 1 to 3) are explained next with reference to accompanying drawings.

Example 1

Figure 1:
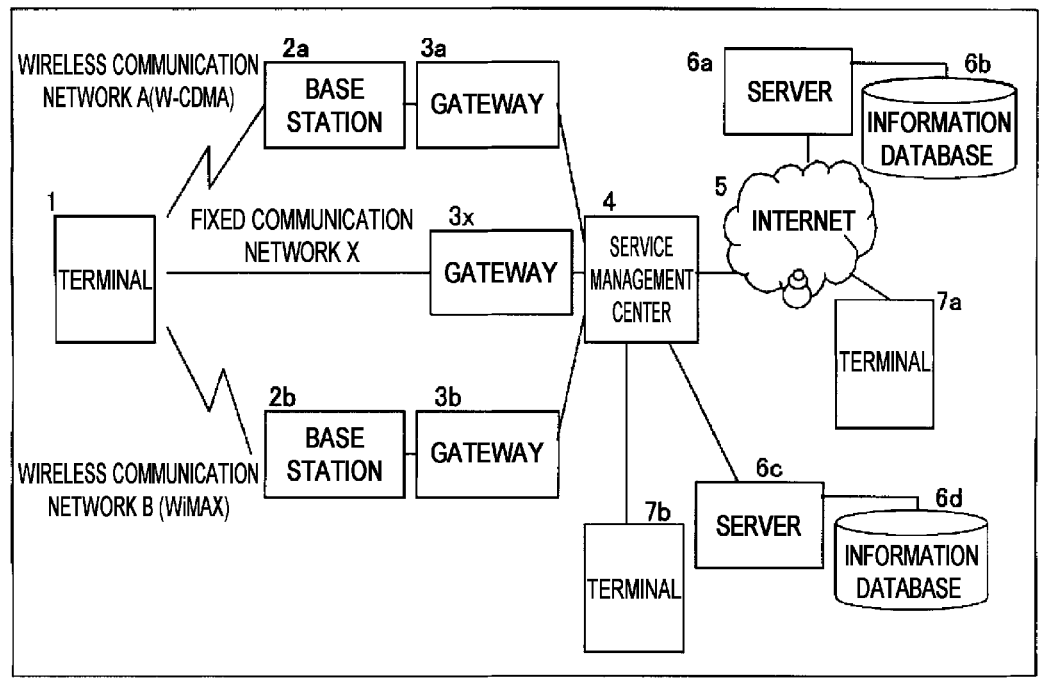
FIG. 1 is a diagram illustrating a network configuration of the present invention (example)

FIG. 1 is a diagram illustrating the network configuration of the present invention (for instance, Example 1). In FIG. 1, a terminal 1 is used by a user in order to enjoy services through connection to a network. The terminal 1 can communicate with three networks. The terminal 1 can communicate with, firstly, a W-CDMA mobile communication network, as a wireless communication network A. Secondly, the terminal 1 can connect with a fixed network as a fixed communication network X, and thirdly, the terminal 1 can communicate with WiMAX (wireless LAN) as a wireless communication network B.

The terminal 1 in the present example can display buttons on a screen, such that the user can operate the buttons displayed on the screen by, for instance, directly touching with his/her fingers, or by tapping with the tip of a pen or the like, at any point of the screen. When connected to a wireless communication network, the terminal 1 communicates with a base station 2a or 2b via a wireless network. Each base station 2a and 2b is connected to gateway 3a and 3b, respectively. When the terminal 1 communicates via a fixed communication network X, the terminal 1 is connected to a gateway 3x. The gateways (3a,3b,3x) are connected to a service management center 4, such that data exchanged through wireless or fixed communication, using respective different schemes, is communicated to the service management center 4.

In the service management center 4, it is determined whether to allow connection to the internet in accordance with some status, such as presence or absence of remaining time, when the user attempts to use a service via the terminal 1; also, the service management center 4 manages the number of minutes (time) of available connection that the user purchased beforehand. The service management center 4 is connected to the internet 5 and is connected directly, not by way of the internet 5, to a server 6c and a second terminal 7b. The server 6a and a third terminal 7a are connected to the internet 5. An information database 6b is connected to the server 6a, such that the information database 6b manages information supplied to the terminal 1 by the server 6a. Similarly, an information database 6d is connected to the server 6c, such that the information database 6d manages information supplied by the server 6c. For the sake of a simpler explanation in the present example, three terminals and two servers are depicted in FIG. 1, but the number of terminals and servers that can be connected in the system is not limited thereto.

FIGS. 2(a) to 2(d) are diagrams illustrating four kinds of display examples of a network connection control screen (window) of the terminal 1. FIG. 2(a) displays "300 minutes" as the remaining time 22a of connection currently available to the user, within a window 21a displayed on the terminal 1. The remaining time is a value purchased beforehand by the user, or received from a third party. The "connected" 23a button is tapped by the user when the latter wishes the terminal 1 to be connected to the network. The portions 24a at which "WCDMA", "fixed" and "WiMAX" are displayed are all network selection buttons. These buttons are of toggle type, i.e. are selected when tapped once, and are unselected when tapped again in that state. The user taps any button to select one or more networks and enable connection thereby.

For instance, when the user taps a "connected" 23a button in a state where only "WCDMA" is selected, as in FIG. 2(a), the terminal 1 attempts connection to the base station 2a via a wireless communication network A (W-CDMA) and to the service management center 4 via the gateway 3a, as illustrated in FIG. 1. The terminal 1 connects to the network if connection of the terminal 1 is allowed by the service management center 4. The network connection control screen is displayed as in 21b of FIG. 2(b). Herein, a "disconnected" 23b button is displayed for use when the user wishes to break the connection off.

FIG. 2(c) illustrates a display example in a case where the user selects "fixed network" as the network. Herein, the user has modified the selected network from WCDMA in FIG. 2(a) to "fixed". As a result, the "300 minutes" displayed as remaining time are now displayed as "43,200 minutes (30 days)". The communication unit price of internet access is cheaper via a fixed network than via WCDMA, and hence the display indicates that using the number of usage units in possession of the user enables communication over a longer time period.

FIG. 2(d) illustrates a display example of an instance where, in the state of FIG. 2(a), the user selects simultaneously both WCDMA and WiMAX as networks. Herein, "100 minutes" is displayed as the remaining time.

Figure 3:
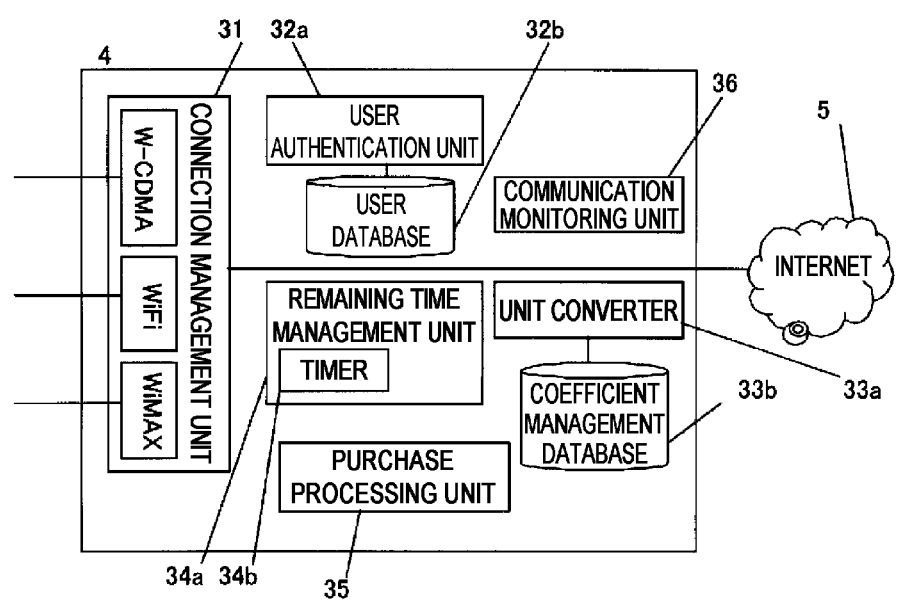
FIG. 3 is a diagram illustrating the internal configuration of a service management center 4 of the first example.

FIG. 3 is a diagram illustrating the internal configuration of the service management center 4. Firstly, the connection management unit 31 manages the connection state at the portion that receives the connection from the terminal 1 according to the different communication schemes (in the present example, "W-CDMA mobile wireless network", "fixed line network" and "WiMAX mobile wireless network"). The service management center 4 has a user authentication unit 32a that authenticates the user upon connection of the terminal 1; a user database 32b that stores information relating to the user, including data relating to the remaining time of available connection; a unit transformer (unit converter) 33a that transforms (converts) the remaining time that the user has, on the basis of, for instance, the kind of network and/or the kind of service; and a coefficient management database 33b that manages coefficients that are used during the unit transformation process and that vary depending on, for instance, the kind of network and the kind of service. The service management center 4 has also a purchase processing unit 35 that performs a process of purchasing anew unit time when the remaining time available to the user is insufficient, and a communication monitoring unit (communication management unit) 36 that monitors the communication in terms of, for instance, a network utilization ratio.

Figure 4:
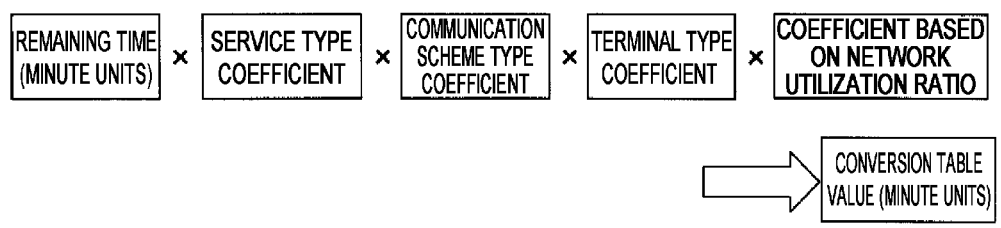
FIG. 4 is a diagram illustrating a calculation procedure of conversion display values by a unit converter.

FIG. 4 is a diagram illustrating the calculation procedure of conversion display values by the unit converter 33a. Herein there is calculated a conversion display value (time in minute units in the present first example) by multiplying a remaining time in minute units, of the present first example, by various coefficients according to the service type, communication scheme type, terminal type, and the status of the network utilization ratio.

Figure 5:
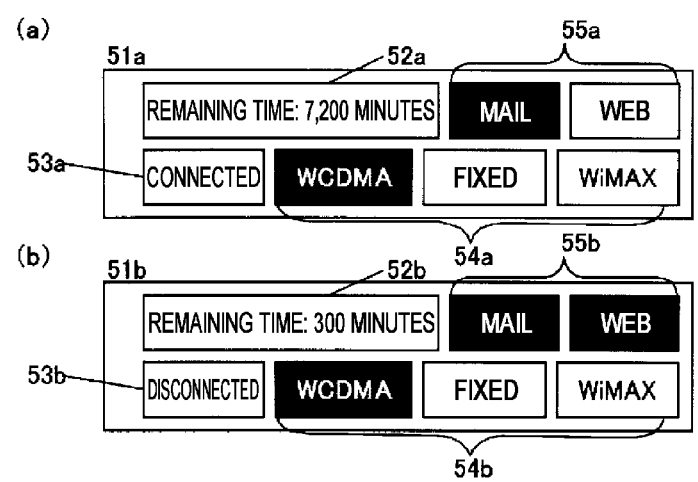
FIG. 5 is a diagram illustrating another display example of a network connection control screen in a terminal of the first example.

FIG. 5 is a diagram illustrating a further display example of the network display control screen in the terminal 1. FIG. 5 illustrates a display example of conversion results obtained using a service type coefficient.

FIGS. 6(a) to 6(d) illustrate a coefficient management table that is stored in a coefficient management database 33b. FIG. 6(a) illustrates coefficients according to network type, FIG. 6(b) illustrates coefficients according to service type, and FIG. 6(c) illustrates coefficients according to the type of the terminal 1 that is employed by the user. FIG. 6(d) illustrates the response of the coefficient according to the network utilization ratio, which denotes the degree of congestion of the network.

Figure 7:
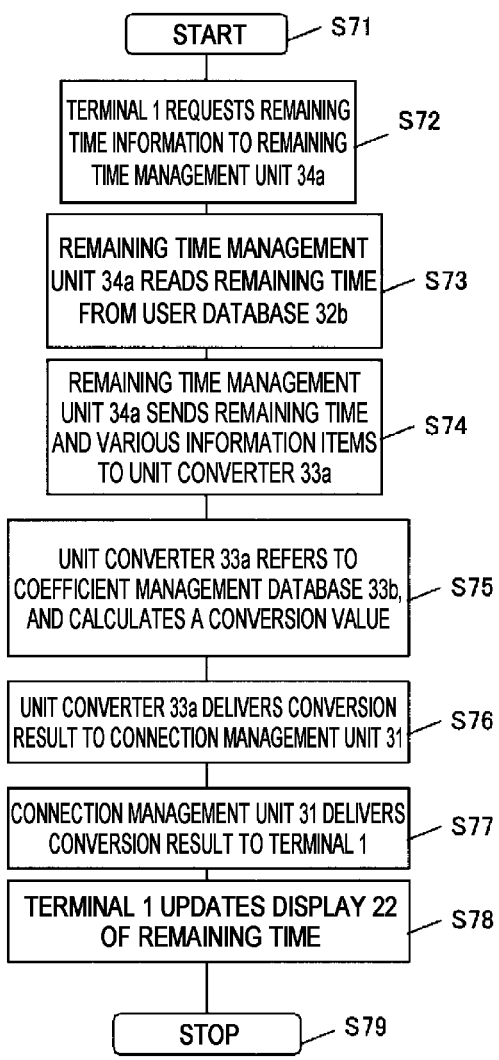
FIG. 7 is a diagram illustrating an example of the flow of internal processing in the service management center 4 of the first example.

FIG. 7 is a diagram illustrating an example of the flow of internal processing at the service management center 4. In particular, FIG. 7 illustrates the flow of processing after request for remaining time information by the terminal 1 up to display of the information.

The first example is explained in more detail below. In the first example, a remaining time management unit 34a, being a remaining unit (usage unit) management unit, counts down (subtracts) the remaining time by means of a timer 34b.

The flow up to display of information, obtained by the terminal 1, relating to the remaining time, will be explained first with reference to FIG. 7. Upon start of the process (S71) the terminal 1 of FIG. 1 requests remaining time information on that user, together with user information, to the remaining time management unit 34a (S72).

The time management unit 34a searches, and reads, the remaining time from the user database 32b (S73). Next, the time management unit 34a sends the remaining time and various information items to the unit converter 33a (S74). The various information items include herein the network type to which the user is connected, the service type and the terminal type. The unit converter 33a refers to the coefficient management database 33b, and calculates a conversion value (S75). The unit converter 33a delivers the conversion result to the connection management unit 31 (S76). The connection management unit 31 delivers the conversion result to the terminal 1. The terminal 1 updates the display 22 (22a and so forth) of remaining time. The flow of the series of processes is over thereby.

Figure 2:
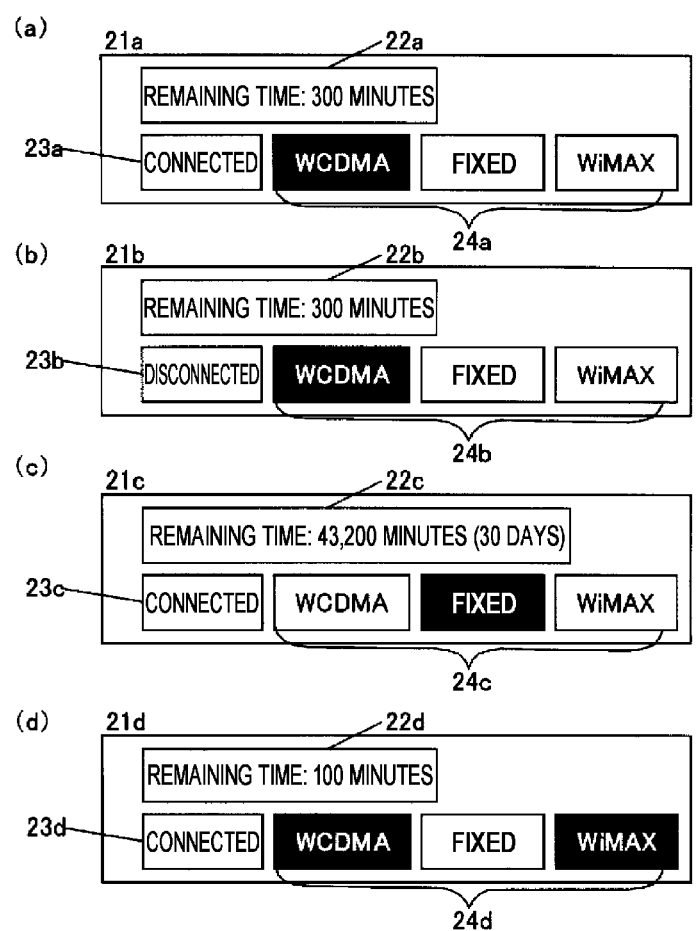
FIG. 2 is a diagram illustrating a display example of a network connection control screen in a terminal 1 of a first example.

An explanation follows next, with reference to the screen display example of FIG. 2 and the coefficient management table of FIG. 6, on conversion/calculation of minutes (time) as the usage unit. If "fixed" is selected, as illustrated in FIG. 2(c), in a state where a WCDMA network is selected in FIG. 2(a), the original time "300 minutes" for connection via a WCDMA network is multiplied by a coefficient "144" assigned to "fixed" in the coefficient management table (FIGS. 6(a)), and "43,200 minutes (30 days)" is displayed as a result. This indicates that the worth of 300 minutes of available connection via the WCDMA network is converted to an equivalent worth of 43,200 minutes of available connection in the case of connection via a fixed network.

In FIG. 2(d), by contrast, the user selects both "WCDMA" and "WiMAX". This indicates that a substantial amount of data is to be exchanged, over a shorter time, through the simultaneous use of two networks. Therefore, the remaining time, which was originally "300 minutes" for a case of "WCDMA" alone, becomes now "100 minutes". In the coefficient management database 33b (FIG. 6(a)), the coefficient for W-CDMA (3G) is "1", and the coefficient for WiMAX is "2". Accordingly, the 100 minutes are calculated through the operation 300×(1/(1+2))=100. This indicates that 100 minutes worth of connection are allowed for communication when both WCDMA and WiMAX are selected. Conversion is performed so that the remaining time decreases, in compensation for the fact that data is exchanged at higher speed through the simultaneous use of the resources of a plurality of networks.

FIG. 5 illustrates the influence of selected service type on the remaining time conversion. In 51a of FIG. 5(a) mail is selected as the service type. This indicates that the user is limited to the exchange of mail over this connection. Herein, the original remaining time of "300 minutes" in FIG. 2(a) is increased to "7,200 minutes". This indicates that now 300 minutes×24=7,200 minutes, since the coefficient in the coefficient management table (FIG. 6(b)) for the case of mail alone, as the service type, is "24". That is, a connection that could be originally used for 5 hours can be now used for 5 days.

In a case where the system is used with a focus on mail, in particular in wireless communication, a function is ordinarily resorted to such that, when a mail arrives, mail data reaches the terminal actively pushed by the mail server, at least apparently. In an actual operation, the terminal 1 checks periodically, via the network, whether a new mail has arrived to the mail server. In many cases, however, no new mail is there upon checking As a result, the user may be reluctant to go on consuming minutes (time), as the usage units, while in mere standby with no communication of data itself taking place. Also, no network band is actually consumed in communication with the terminal 1 during that time. Accordingly, the worth of the effective remaining time is increased.

In a case where both "mail" and "web" are selected, the conversion depends on service types that involve a greater utilization of the network, and, for instance, there is used the smallest value from among the coefficients of the respective service types that are applicable. For example, there is used a coefficient "1" that is assigned to web. Therefore, the remaining time is converted from "7,200 minutes" (52a in FIGS. 5(a)) to "300 minutes" (52b in FIG. 5(b)), and is displayed.

Example 2

Figure 8:
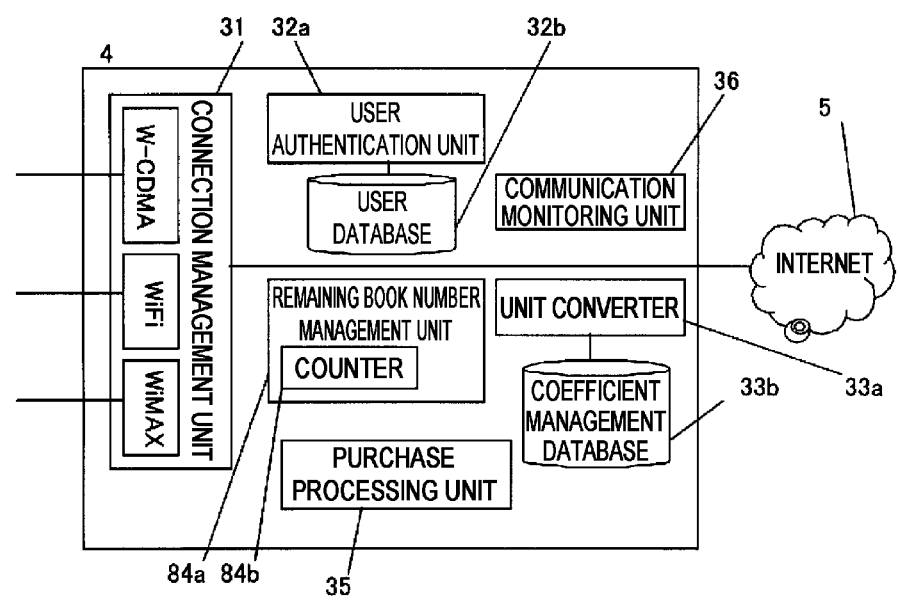
FIG. 8 is a diagram illustrating the internal configuration of the service management center 4 in a second example.
Figure 9:
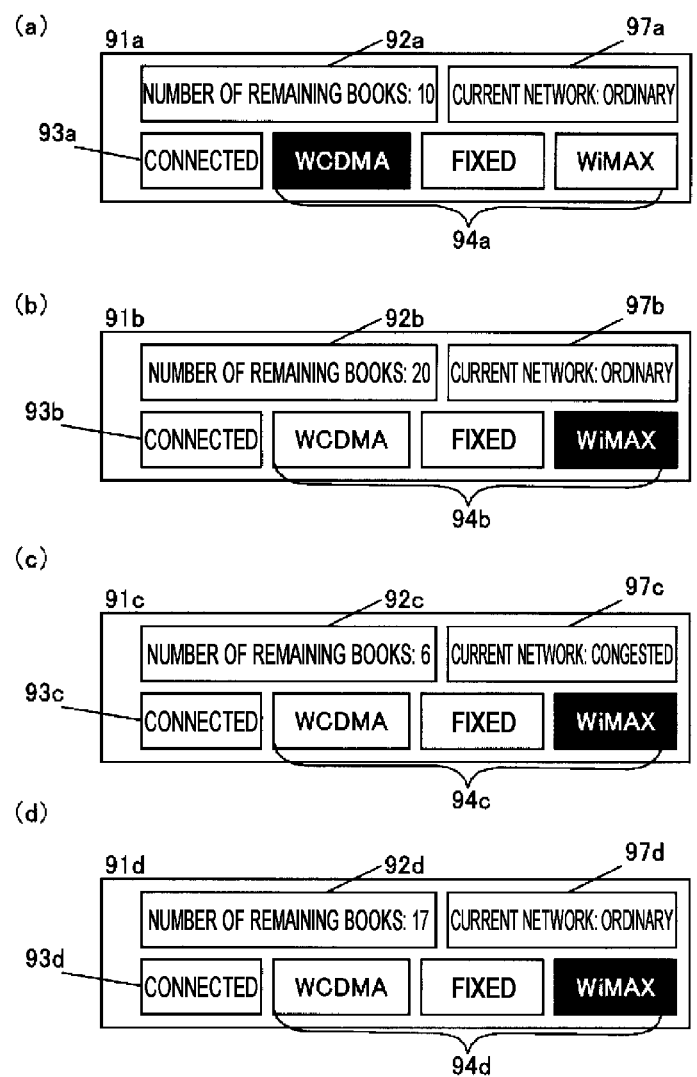
FIG. 9 is a diagram illustrating a display example of a network connection I control screen in a terminal of the second example.

A second example is explained below. FIG. 8 illustrates the internal configuration of the service management center 4 in a second example of the present invention. FIG. 9 illustrates four screen display windows as examples of display, on the terminal 1, of a balance (number of remaining books) in a second example of the present invention.

In the first example described above, the units for conversion were "minutes" (time). However, the invention is not necessarily limited thereto, and there may be used units according to the purpose for which the terminal of the user is used. In the second example an example is illustrated wherein the terminal 1 is display terminal of an electronic book. The user can designate and purchase beforehand the number of electronic books (or a right thereto) that the user wishes to read a on the terminal 1, through download via a network. In the case of, for instance, a purchase of the right to download 10 books by paying 1000 yen, a remaining book number management unit 84a, as a remaining unit management unit of the second example, manages not minutes (time) as in the first example, but number of books (for instance, 10 books). The remaining book number management unit 84a counts down (subtracts) the number of remaining books using a counter (book counter) 84b. The number of remaining books (10 books) is displayed on the connection control display of the terminal 1. In this example, the fee includes a network communication fee, a server access service fee, and an electronic book information fee. Therefore, one purchase by the user implies payment of all the expenses involved in getting and reading the electronic book in the terminal 1.

An example is explained next, with reference to FIG. 9, of conversion display of the number of remaining books in accordance with the type of communication scheme of the network to which the terminal is connected and in accordance with the status of the network utilization ratio. In a window (screen) 91a of FIG. 9(a), firstly, WCDMA is selected as the network, and the congestion of the WCDMA network at that time (portion 97a of the display) is "ordinary". Herein, the congestion (97a and so forth) of the network is determined on the basis of the utilization ratio of the network as monitored by the communication management unit 36. In the present second example, as illustrated in FIG. 6(d), the congestion status is defined as "clear" if the network utilization ratio is smaller than 20%, as "ordinary" if the network utilization ratio ranges from 20% or greater to less than 80%, and "congested" if network utilization ratio is 80% or greater. This status (congestion) is sent to the terminal 1 from a center, upon request by the terminal 1, and is displayed on a window. In 92a, the number of remaining books is displayed as 10.

An example is illustrated next, from window 91b of FIG. 9(b) onwards, of an instance where the user selects "WiMAX" as the network. The state (congestion) is "current network: ordinary". Therefore, "20 books" is displayed as the result of the conversion of the number of remaining books in that state, using FIG. 6(a) and FIG. 6(d) of the coefficient management database 33b. This figure derives from a coefficient "2" for network type "WiMAX" in FIG. 6(a), and a coefficient "1" in FIG. 6(d) since the network utilization ratio is "ordinary"; that is 10×2×1=20.

Thereafter, as indicated by 91c in FIG. 9(c), the network state becomes "congested". This denotes a state wherein multiple users are using the network. Herein, the coefficient in FIG. 6(d) changes from "ordinary" "1" to "congested" "0.3". A value reduced to 6 books, namely 10×2×0.3=6, is displayed. That is, the display indicates that the worth purchased by the user beforehand drops from 20 books to 6 books when book data is downloaded over a congested network. Supposing that, in this state, the user downloads one book, the number of remaining books drops to 5 books. Now, 91d in FIG. 9(d) illustrates an example where the state of the network becomes "ordinary" immediately thereafter. Accordingly, 17 books (92d) are displayed as the number of remaining books. This is the result of the calculation 5/0.3=17 (with fractional rounding). Thus, the network "worth" increases, and the worth of the downloadable stock decreases accordingly, when the network is congested with a high network utilization ratio. The 20 books were supposed to be purchasable in the case of an "ordinary" network state. By purchasing one book at a time of "congested" network, however, the purchase right that remains once the state of the network reverts later to "ordinary" is only 17 books. The user can be said to have elected to execute a purchase at an instant where the network state was "congested", even the expense of sacrificing two books that could have been used. As a result, the system can induce the user to download book data at a time where the network utilization ratio is lower. This is effective for promoting a more efficient network supply, through spreading of the network utilization ratio.

In another application example, the unit of the worth of network use can be managed not in the form of minutes (time) or purchasable number of books, but in the form of the number of times over which connection is possible between a communicating partner (or server) and a partner (or server) thereof. In this case, the user purchases the number of connections with a partner (user). For instance, the stock of remaining number of times available to the user for connecting with a partner is rendered smaller through association of a small coefficient, according to a partner (user identifier) or server (IP address) to which more users are connected.

In the examples thus far, the unit converter 33a and the coefficient management database 33b are both held in the service management center 4, but the unit converter 33a and the coefficient management database 33b can be easily adapted to an example where replicated data of the foregoing are held in the terminal 1. In this case, communication is established with the service management center 4 at periods specified beforehand in the terminal 1, or as instructed by the user, and the content of the coefficient management database 33b is replicated in the terminal 1. As a result, when the user intends to connect to the terminal 1 to the network, a remaining time such as those illustrated in FIG. 2 can be converted and displayed, by connection type, before the start of the actual connection. This is easier to understand for the user, and network resources can be used more effectively in that network connections for confirmation are rendered unnecessary.

Example 3

As the case may require, the user may perform an additional purchase online (using, for instance, the purchase processing unit 35 or the like), from the terminal 1, for purchased usage units (minutes (time), number of books (number of articles), number of times (number of connections) of allowed communication (connection) with a partner, number of points (neutral point count in terms of the purpose of use in itself, for instance electronic currency, mileage points or the like)). A third example will be explained next with reference to FIG. 10 and FIG. 11.

FIG. 10 illustrates a configuration example of a table in a user database that is stored and managed by the user database 32b in the third example. FIG. 11 illustrates a screen display example, in the terminal 1, for a conversion unit display and payment balance after a charge (payment) operation in order for the user to purchase a remaining usage unit price in the third example.

The table in FIG. 10 includes a user ID for uniquely identifying a user, a phone number of the terminal 1 through which the user enjoys the service, a sum (corresponding to usage units and rights) of the already-paid balance of the user, and a period of validity of the balance. Briefly, for instance the user having a user ID number "001" uses a terminal 1 to which the phone number "1234" is assigned. The current sum balance is "1,000 yen", and the period of validity of the balance is "Apr. 1, 2009".

As illustrated in FIG. 11(a), a network connection control screen 91a is displayed on the terminal 1 of the user, such that a charge (payment) button 95 is displayed on the network connection control screen 91a. When the remaining time reaches zero or decreases, the user adds minutes (time), as a usable connection unit price, by tapping a charge (payment) button 95. Upon tapping of the button 95, the 1 terminal 1 displays a payment balance display screen 96a as shown in FIG. 11(b).

A user ID ("001"), as the user identifier, is displayed on the screen 96a. A terminal phone number ("1234"), a payment balance ("1,000 yen") and a period of validity "Apr. 1, 2009" of the balance are also displayed on the screen 96a. There is also displayed the conversion time of the network connection corresponding to the payment balance, for each intervening network during the connection. In the case of, for instance, network connection via WCDMA, the conversion time is 100 minutes; for a fixed network, the conversion time is 14,400 minutes; and for WiMAX, the conversion time is 200 minutes. The display screen 96a has also a button for designating an additional charge (payment) operation, and a button "close" for closing the display screen.

The display screen 96b of FIG. 11(c) displays also a payment balance display screen, in the terminal 1, to which electronic books are downloaded, in another example. This screen differs from the screen 96a in that the unit for conversion and comparison is now the number of electronic books. That is, the conversion units correspond to 10 books in a case where the payment balance is 1,000 yen and the electronic books are downloaded using a WCDMA network. The conversion units correspond to 20 books, for download using a fixed network, and 15 books, for download using WiMAX.

In a case where the user further taps the "to additional charge (payment)" and pays according to the settling procedures for payment, the remaining usage units that are managed in the user management database 32b of the service management center 4 are increased by the purchased units.

In addition to direct purchases with cash or the like, as described above, another application of the present system allows a certain number of units to be given by an operator, or by an advertiser, as part of an advertisement campaign.

Needless to say, the present invention can accommodate various modifications without departing from the scope thereof.

The present invention is ordinarily useful in a wide variety of environments, in the telecommunication industry, where information is exchanged through access of a terminal to a server.

The invention claimed is:
1. A computer-implemented method for adjusting an amount of network usage units available to a user based on a network utilization ratio, comprising:

receiving, from a terminal, a request for network usage units associated with a user;

searching a user database that stores network usage units associated with an account of the user, thereby determining a number of network usage units for the user;

providing the number of network usage units associated with the user to a unit converter;

retrieving, at the unit converter, a modifying coefficient that is based on a current network utilization ratio;

calculating an adjusted amount of network usage units associated with the user by multiplying the number of network usage units by the modifying coefficient; and providing, to the terminal, the adjusted amount of network usage units associated with the user.

2. The method of claim 1, wherein the network usage units comprise one or more minutes.

3. The method of claim 1, wherein the network usage units comprise one or more books.

4. The method of claim 1, wherein the network usage units comprise a number of communication connections.

5. The method of claim 1, wherein the modifying coefficient is 1 when the network utilization ratio is within a normal range.

6. The method of claim 1, wherein the modifying coefficient is greater than 1 when the network utilization ratio falls below a threshold value.

7. The method of claim 1, wherein the modifying coefficient is less than 1 when the network utilization ratio is greater than a threshold value.

8. The method of claim 1, wherein the modifying coefficient is inversely proportional to the network utilization ratio.

9. A computer-implemented method for determining an adjusted amount of network usage units available to a user based on a network utilization ratio, comprising:

determining a number of network usage units available to the user, wherein the initial number of network usage units is independent of a network utilization ratio;

providing the number of network usage units associated with the user to a unit converter;

determining a modifying coefficient based on at least one of a network utilization ratio and one or more services selected by the user; and calculating an adjusted amount of network usage units associated with the user by multiplying the number of network usage units by the modifying coefficient.

10. The method of claim 9, wherein the modifying coefficient is 1 when the network utilization ratio is within a normal range.

11. The method of claim 9, wherein the modifying coefficient is greater than 1 when the network utilization ratio falls below a threshold value.

12. The method of claim 9, wherein the modifying coefficient is less than 1 when the network utilization ratio is greater than a threshold value.

13. The method of claim 9, wherein the modifying coefficient is inversely proportional to the network utilization ratio.

14. The method of claim 9, wherein a magnitude of the modifying coefficient is adjusted based on a service selected by the user.

* * * * *